United States Patent [19]

Morishige et al.

[11] Patent Number: 5,319,999
[45] Date of Patent: Jun. 14, 1994

[54] CONTROL APPARATUS FOR STEPLESS TRANSMISSION FOR VEHICLES

[75] Inventors: Chitoshi Morishige, Hiroshima; Tomoo Sawasaki, Higashihiroshima; Syuichi Kawamura, Hiroshima, all of Japan

[73] Assignee: Mazda Motor Corporation, Hiroshima, Japan

[21] Appl. No.: 904,830

[22] Filed: Jun. 26, 1992

[30] Foreign Application Priority Data

Jun. 29, 1991 [JP] Japan ................ 3-185310

[51] Int. Cl.⁵ ............................. B60K 41/16
[52] U.S. Cl. ........................... 477/46; 364/424.1
[58] Field of Search ............ 74/866; 364/424.1

[56] References Cited

U.S. PATENT DOCUMENTS

| | | | |
|---|---|---|---|
| 4,853,858 | 8/1989 | Kumura | 74/866 X |
| 4,872,115 | 10/1989 | Itoh et al. | 74/866 X |
| 5,062,049 | 10/1991 | Taylor | 74/866 X |
| 5,062,050 | 10/1991 | Petzold et al. | 74/866 X |
| 5,092,198 | 3/1992 | Morishige et al. | 74/866 OR |
| 5,144,864 | 9/1992 | Sawasaki et al. | 74/866 OR |
| 5,156,572 | 10/1992 | Morishige | 74/866 X |

FOREIGN PATENT DOCUMENTS 2-3751 1/1990 Japan .
3-27791 4/1991 Japan .

Primary Examiner—Leslie A. Braun
Assistant Examiner—Daniel Wittels

[57] ABSTRACT

A control apparatus for controlling a stepless transmission which changes the effective diameter between a primary pulley and a secondary pulley by cyclically controlling a change rate toward a target value to be set in advance based upon the characteristic set in advance. The apparatus detects the throttle opening degree TVO, a RANGE signal, the revolutional frequency of the secondary pulley Ns and the like, and detects whether the vehicle is in a transitional status of an acceleration operation or a deceleration operation. At a point in time during the transitional period, the apparatus sets a first target value based upon the signals such as the TVO signal, the RANGE signal and the Ns signal, and sets a second target value based upon the difference between the first target value set in the current control cycle and the second target value set in the previous control cycle, at the same time, sets a change in the second target value to be smaller than that in the first target value. The change rate is controlled toward this second target value.

8 Claims, 13 Drawing Sheets

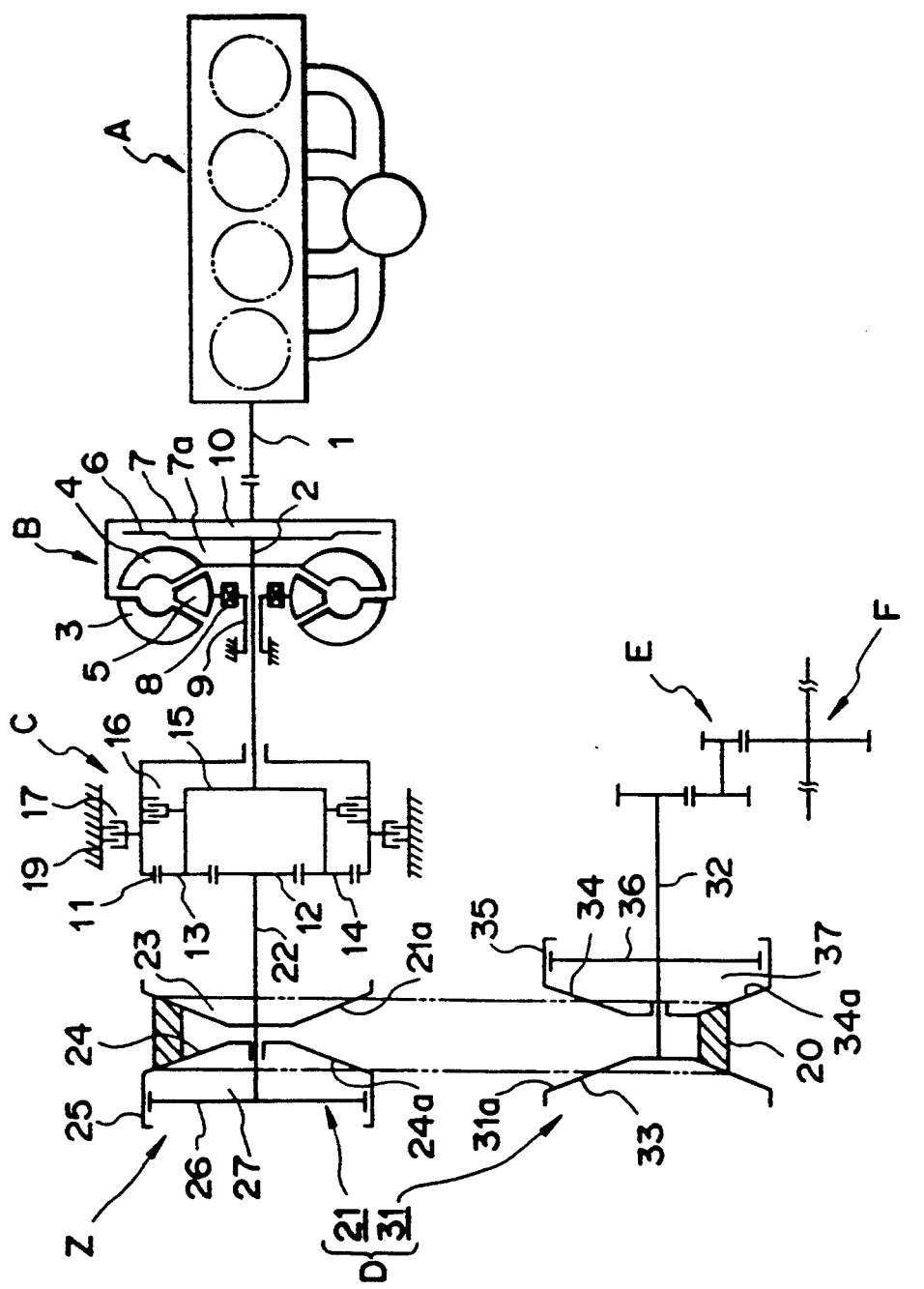

CONTROL APPARATUS FOR STEPLESS TRANSMISSION FOR VEHICLES

BACKGROUND OF THE INVENTION

The present invention relates to a control apparatus for controlling a stepless transmission for vehicles, and more particularly, to improvement of acceleration operation and deceleration operation of the transmission in a transitional period.

Conventionally, a control apparatus which steplessly changes engine output transmitted via a hydraulic coupling and transmits the engine output to wheels, as disclosed in Japanese Patent Application Laid-Open (Kokai) No. 2-3751, has been known as "a V-shaped belt type control apparatus for stepless transmission for vehicles".

In this type of stepless transmission control apparatus, a target value of a control variable such as revolutional frequency of a primary pulley (a pulley closer to an engine side) or change speed ratio is set, and the control variable is controlled toward the target value.

Japanese Patent Publication (Kokoku) No. 3-27791 shows a case where a driver accelerates vehicle speed with this type of stepless transmission. The target value of a predetermined control variable (e.g., for the revolutional frequency of a primary pulley) is set to be large, and the revolutional frequency of an engine or the reduction ratio of pulley revolution is increased following the target value. As a result, the revolution ratio of the stepless transmission varies toward a reduced side. The problem is that the engine having large inertia moment wastes a large part of the increase of output torque within a short period after the acceleration operation, without using much of the output for the driving force of the vehicle. The driver cannot attain enough of the acceleration operation nor feels the speed has been fully increased.

For the above reason, Japanese Patent Publication 3-27791 sets a target value of transitional-period control variable which increases in accordance with at least one of the increase rate of an acceleration operation amount (e.g., an amount indicative of stepping on the accelerator) and that of the vehicle velocity.

In Japanese Patent Publication 3-27791, when a predetermined delay time has passed after the acceleration operation is initiated, a target value is increased in a stepwise manner by a step change rate based on a map and the like. Thereafter, the target value is linearly increased in an increase rate of inclination obtained by a predetermined calculation. Under this control, the target values of the transitional period can be made lower than those of stable operation time, preventing excessive increase of engine revolutional frequency, and improving the acceleration operation.

However, there are limits on precise setting of the target value in Japanese Patent Publication 3-27791, since even though it also uses various detection signals for the transmission or the status of the engine, the apparatus basically sets a target value based upon the map or the calculation. More specifically, hydraulic pressure supplied to the input-side pulley and the output-side pulley, oil temperature, variations in hydraulic pressure controlling valves as products and the like influence a reduction ratio of speed of the stepless transmission, causing difficulty in precise setting of a target value. Further, the apparatus determines an increase rate of a target value of transitional period control variable in accordance with a target value of stable period control variable just before the velocity change operation is initiated. Namely, the apparatus determines the target value without consideration to a target value of the stable period control variable during a transitional period. Accordingly, the target value of the transitional period control variable determined based on the above increase rate differs from a target value of stable operation control variable. Also, the target value of transitional period control variable may be inappropriate.

SUMMARY OF THE INVENTION

In view of the above problems and drawbacks, the present invention has as its object to provide a control apparatus for controlling a stepless transmission for vehicles which enables precise setting of a target value of control variable in a transitional period smaller than that in a stable operation time.

In order to attain the foregoing object, an apparatus according to the present invention, which controls a stepless transmission for vehicles by cyclically controlling a control variable toward a target value to be set based upon the characteristic which has been set in advance, comprising:

signal detection means for detecting a plurality of signals indicative of operating status of a stepless transmission or an engine connected to the transmission;

status detection means for detecting whether a vehicle is in acceleration operation or in deceleration operation;

target value setting means for setting a first target value and a second target value at a point in time during a transitional period in response to the detection by the status detection means, wherein the target value setting means sets the first target value based upon the plurality of signals, and sets the second target value based upon a difference between the first target value set in the current control cycle and a second target value set in a previous control cycle, at the same time, the target value setting means sets a change in the second target value to be smaller than that in the first target value; and control means for controlling the control variable toward the second target value.

According to the present invention, the first target value is set based upon signals indicative of driving status of the vehicle, e.g., a throttle opening signal and a RANGE signal and so on, then a second target value is set in accordance with the first target value. At this time, a change in the second target value is set to be smaller than that in the first target value. As the second target value is determined corresponding to actual driving conditions, the control of the present invention can be appropriate to the actual driving. Further, the second target value is more stable than the first target value which varies reflecting a change by an acceleration operation.

Another object of the present invention is, in a case where the control variable is defined by a ratio of a revolutional frequency of a primary pulley to that of a secondary pulley, to provide a control apparatus which enables control with a smooth and precise change ratio in a transitional period in a velocity change operation.

According to another aspect of the present invention, the target value setting means calculates the change in the first target value as a change from the second target value set in the previous control cycle to the first target value set in the current control cycle, and calculates the change in the second target value as a change from the second target value set in the previous control cycle to the second target value to be set in the current control cycle.

Yet a further object of the present invention is to provide a control apparatus which can set the second target value based upon a change ratio correction function with the difference as its parameter.

Another object of the present invention is to provide a control apparatus which can improve convergence of a control variable upon a target value, and can prevent a hunting status.

Further, another object of the present invention is to provide a control apparatus which controls a control variable by switching over feedforward control and feedback control maintaining the continuity between the F/F control and F/B control.

Further, another object of the present invention is to provide a control apparatus which determines an upper value and a lower value used by clip means in accordance with a difference between the change ratio in the second target value set in the previous control cycle and that in the second target value to be set in a current control cycle, and which can raise control response.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 illustrates a torque transmission system including the stepless transmission of FIG. 1;

DETAILED DESCRIPTION OF THE PREFERRED EMBODIMENTS

Figure 1A:
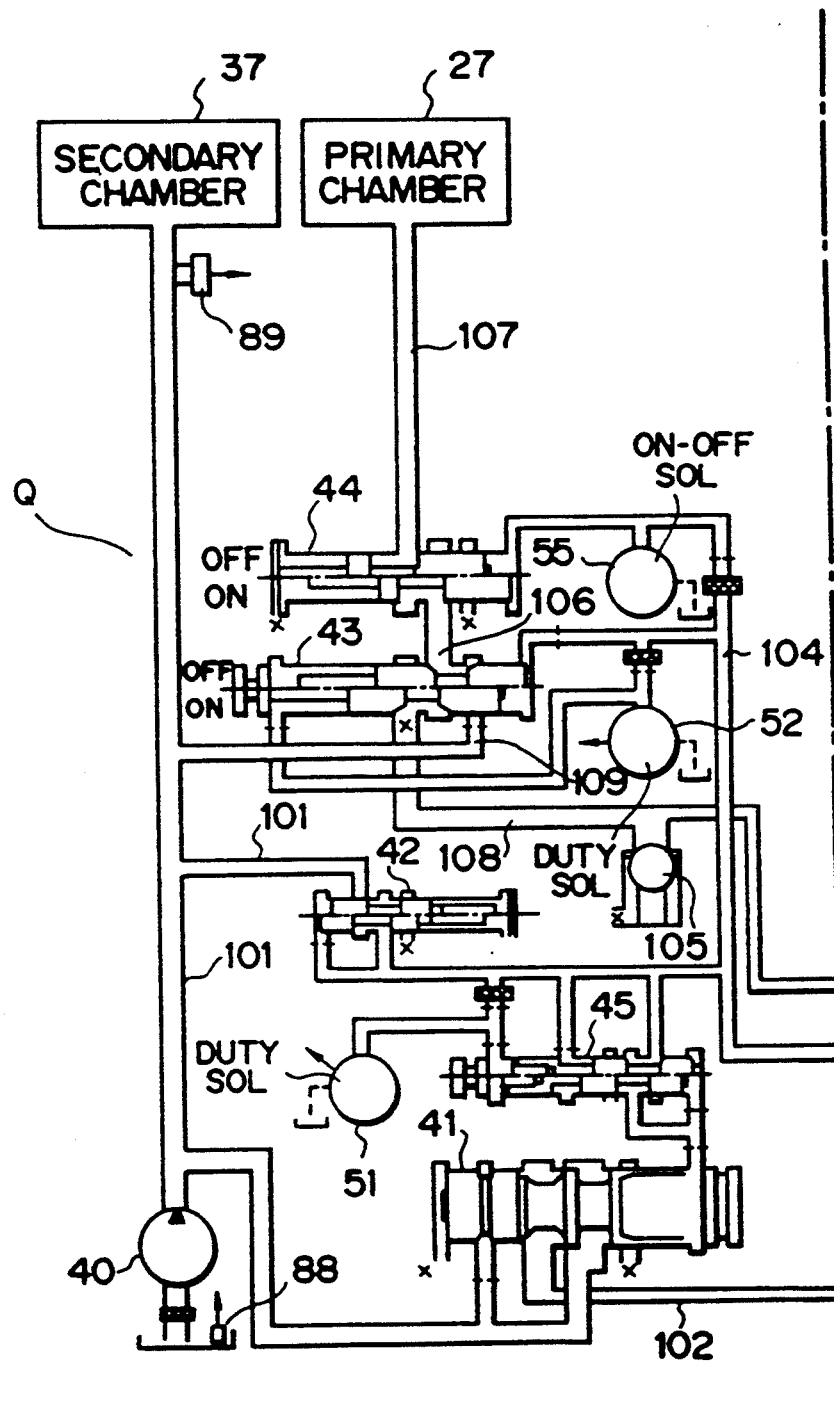
FIGS. 1A and 1B illustrate the structure of a hydraulic circuit of a stepless transmission of an embodiment of the invention.

A preferred embodiment of the present invention will be described in detail in accordance with the accompanying drawings.

In this embodiment, the present invention is applied to a hydraulic control apparatus in a V-type belt stepless transmission.

<Structure of Stepless Transmission>

The structure of a stepless transmission Z will be described with reference to FIG. 2.

The stepless transmission Z, which is for a vehicle of front wheel driven type, basically comprises a torque converter B connected to an output shaft 1 of an engine A, a forward/reverse switch mechanism C, a belt transmission mechanism D, a reduction mechanism E and a differential mechanism F. Note that the structures of the reduction mechanism E and the differential mechanism F are generally known and therefore detailed explanations will be omitted.

The torque converter B comprises a pump impeller 3 fixed to a side portion of a pump cover 7 connected to the engine output shaft 1, a turbine runner 4 rotatably arranged in a converter front chamber 7a formed inside of the pump cover 7 and a stator 5 set between the pump impeller 3 and the turbine runner 4. The turbine runner 4 opposes the pump impeller 3 which integrally rotates with the engine output shaft 1. The stator 5 increases the torque. The turbine runner 4 is connected to a carrier 15 which is an input member of the forward/reverse switch mechanism C via a turbine 2. The stator 5 is connected to a mission case 19 via a one-way clutch 8 and a stator shaft 9. A lockup piston 6 is arranged between the turbine runner 4 and the pump cover 7. The lockup piston 6 is slidably attached to the turbine shaft 2, and is selectively slid to switch over a lockup status and a converter status by introduction/discharge of hydraulic pressure to the converter front chamber 7a and a converter rear chamber 10. In the lockup status, where the engine output shaft 1 and the turbine shaft 2 are directly combined without any fluid, the lockup piston 6 is in contact with the pump cover 7 and integrated with the same, while in the converter status, where the engine output shaft 1 and the turbine shaft 2 are combined via a fluid, the lockup piston 6 separates from the pump cover 7.

The forward/reverse switch mechanism C, constructed by a double-pinion planetary gear unit, selectively sets a forward status for simply transmitting the rotation of the turbine shaft 2 in the torque converter B to the belt transmission mechanism D, and a reverse status for transmitting the rotation of the turbine shaft 2 in a reverse manner.

A first pinion gear 13 in mesh with a sun gear 12 and a second pinion gear 14 in mesh with a ring gear 11 are attached to the carrier 15 spline-connected with the turbine shaft 2. The sun gear 12 is spline-connected to a primary shaft 22 in the belt transmission mechanism D. A FWD clutch 16 for connecting and separating the ring gear 11 and the carrier 15 is arranged therebetween, and between the ring gear 11 and the mission case 19, a REV clutch 17 is arranged. When the FWD clutch 16 is fastened and the REV clutch 17 is opened, the ring gear 11 and the carrier 15 are integrated and the ring gear 11 becomes relatively rotatable with respect to the mission case 19. The rotation of the turbine shaft 2 is output from the sun gear 12 as a rotation in the same direction to the primary shaft 22 side (forward mode). On the other hand, when the FWD clutch 16 is opened and the REV clutch 17 is fastened, the ring gear 11 is fixed on the mission case 19 side and the ring gear 11, and the carrier 15 become relatively rotatable to each other. The rotation of the turbine shaft 2 is output from the sun gear 12 as a reversed rotation to the primary shaft 22 side via the first pinion gear 13 and the second pinion gear 14 (reverse mode).

The belt transmission mechanism D is constituted by a primary pulley 21 arranged behind and coaxially with the forward/reverse switch mechanism C, a secondary pulley 31 separately arranged in parallel to the primary pulley 21 and a belt 20 extending between both pulleys.

The primary pulley 21 comprises a fixed conical plate 23 having a predetermined diameter and a movable conical plate 24 axially movable with respect to the position of the primary shaft 22. The fixed conical plate 23 is integrally formed with the primary shaft 22, which is coaxially arranged with the turbine shaft 2, and an axial end portion of which is spline-connected to the sun gear 12 of the forward/reverse switch mechanism C. The conical frictional surface of the plate 23 and the conical frictional surface of the plate 24 form a belt receiving groove 21a having a substantially V-shaped cross section.

A cylinder 25 is secured adjacent to an outer surface 24a of the movable conical plate 24 A piston 26 which is fixed to the primary shaft 22 is fit-inserted into the cylinder 25 in an oil-tight manner. The piston 26, the cylinder 25 and the movable conical plate 24 form a primary chamber 27, to which line pressure is introduced from a hydraulic circuit Q (described later). In this primary pulley 21, the movable conical plate 24 is displaced toward the shaft direction by the hydraulic pressure introduced to the primary chamber 27, adjusting the interval from the fixed conical plate 23, and thus adjusting an effective diameter with respect to the belt 20.

The secondary pulley 31, basically constituted in a similar manner to the primary pulley 21, comprises a fixed conical plate 33 integrally arranged with a secondary shaft 32 which is separately arranged in parallel to the primary shaft 22, and a movable conical plate 34 movable along the axial direction of the secondary shaft 32. The secondary pulley 31 further comprises a belt receiving groove 31a having a substantially V-shaped cross-section formed for holding the belt 20 between a conical frictional surface 44a of the plate 33 and the conical frictional surface of the plate 34 opposing to each other.

A cylinder 35 having simplified steps is coaxially secured adjacent to an outer surface 34a of the movable conical plate 34. A piston 36, the axial part of which is fixed to the secondary shaft 32, is oil-tightly fit-inserted into the cylinder 35. The piston 36, the cylinder 35 and the movable conical plate 34 form a secondary chamber 37, to which line pressure is introduced from the hydraulic circuit Q. Similarly to the primary pulley 21, in the secondary pulley 31, the movable conical plate 34 is displaced along the axial direction to adjust the interval from the fixed conical plate 33, thus adjusting an effective diameter with respect to the belt 20. Note that the receiving surface of the movable conical plate 34 is set to be smaller than that of the movable conical plate 24 of the primary pulley 21.

Next, the operation of the stepless transmission Z will be simply described below.

The forward/reverse switch mechanism C sets the rotational direction of the torque transmitted via the torque converter B from the engine A to a forward direction or a reverse direction and transmits the torque to the belt transmission mechanism D.

In the belt transmission mechanism D, the effective diameter of the primary pulley 21 is adjusted by introduction or discharge of hydraulic operating oil to the primary chamber 27, while that of the secondary pulley 31 connected to the primary pulley 21 via the belt 20 is adjusted in a similar manner. A change ratio between the primary shaft 22 and the secondary shaft 32 is determined by a ratio of the effective diameter of the primary pulley 21 to that of the secondary pulley 31. The rotation of the secondary shaft 32 is reduced in the reduction mechanism E then transmitted to the differential mechanism F, and further transmitted from the differential mechanism F to a front wheel shaft (not shown).

Figure 1B:
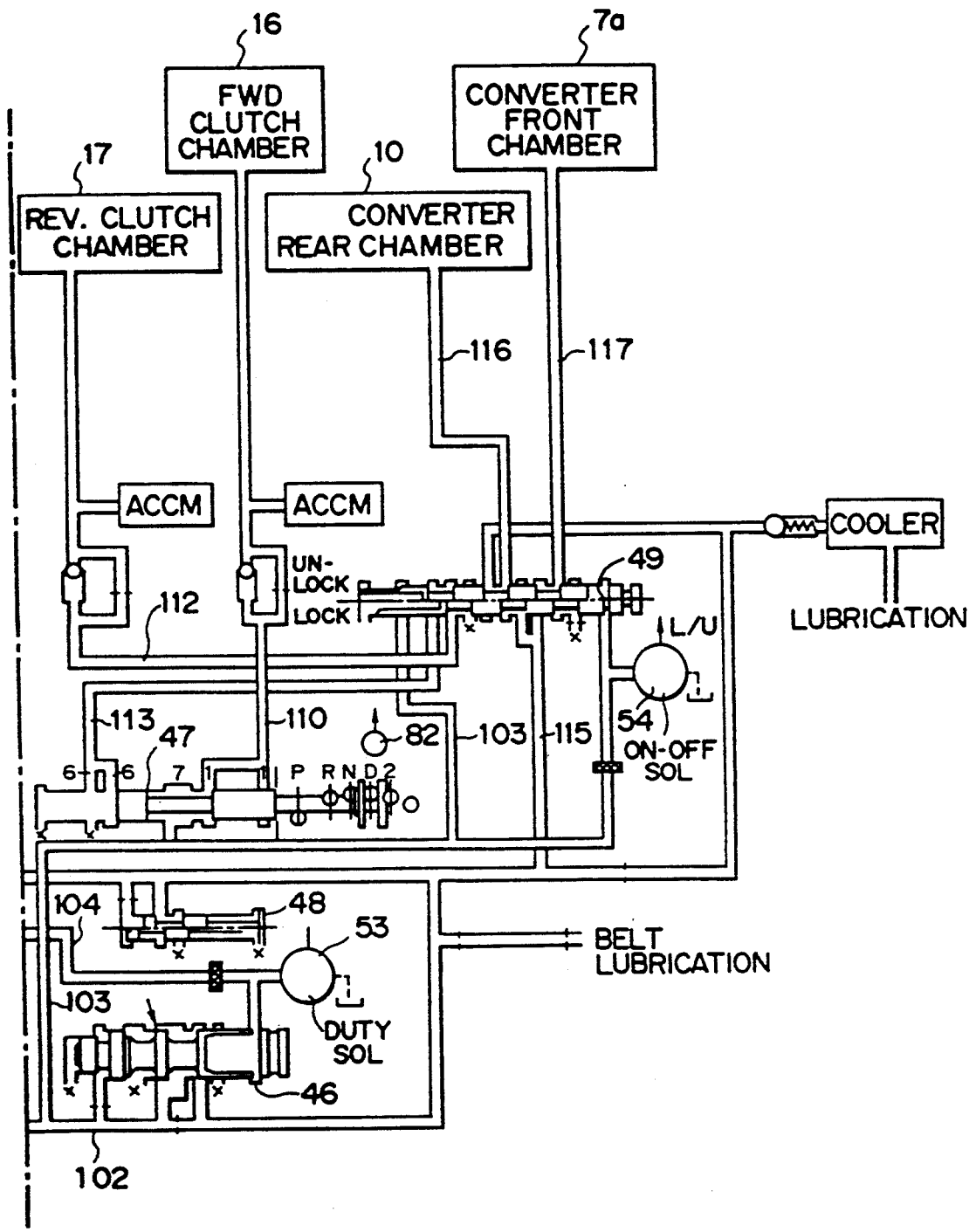
Figure 3:
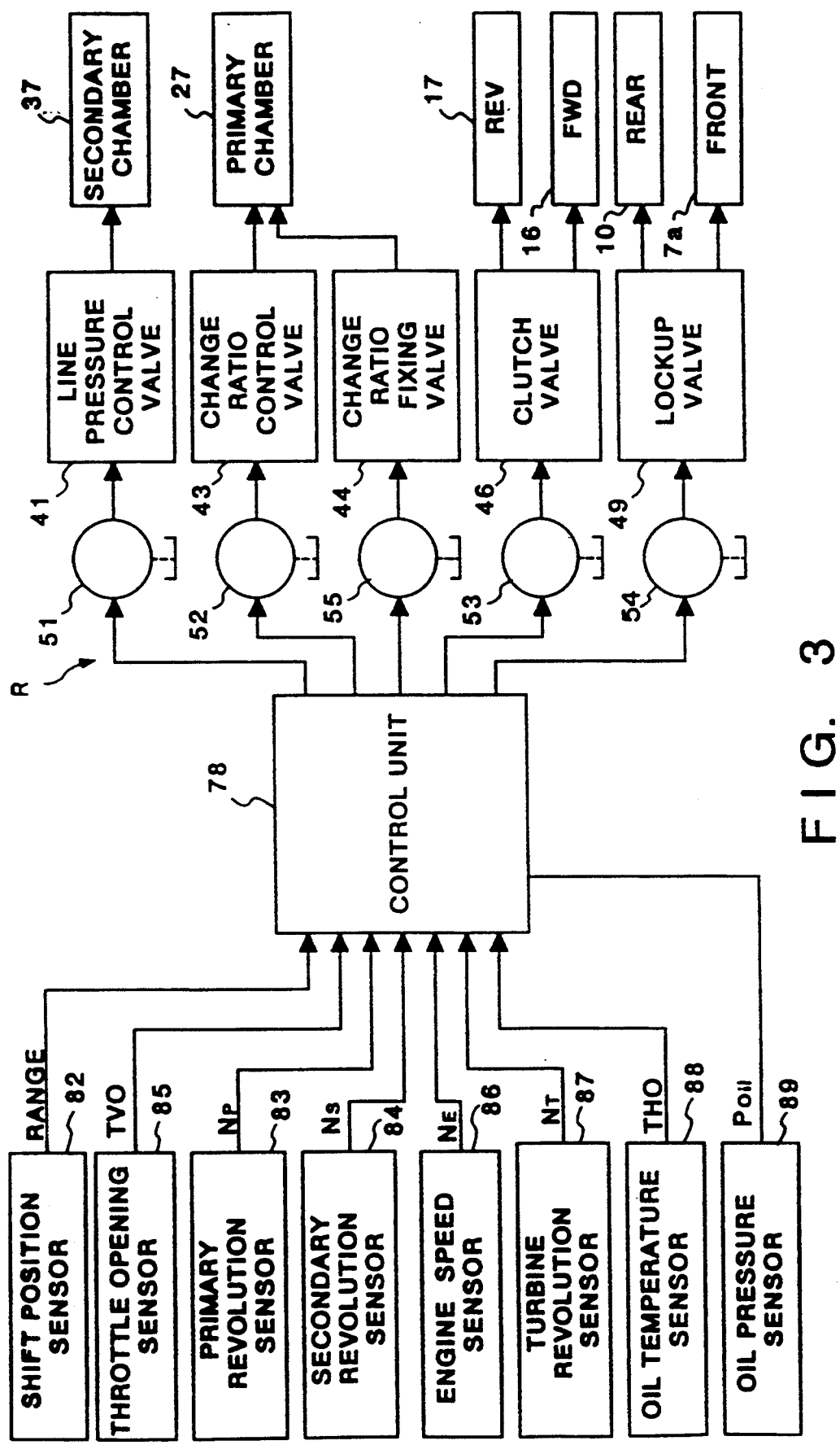
FIG. 3 is a block diagram showing a control system of the stepless transmission of FIG. 1.

Next, the structure of the hydraulic circuit Q will be described below with reference to FIGS. 1A, 1B and 3.

The hydraulic circuit Q supplies adjusted hydraulic pressure to a converter front chamber 7a for connecting the lockup piston 6, and a converter rear chamber 10 of the torque converter B, to the FWD clutch chamber 16 and the REV clutch chamber 17 of the forward/reverse switch mechanism C, and to the primary chamber 27 for the primary pulley 21 and the secondary chamber 37 for the secondary pulley 31 of the belt transmission mechanism D. Note that the hydraulic circuit Q is equipped with an oil pump 40 driven by the engine A as a power supply source for the overall circuit Q.

The main constituting members of the hydraulic circuit Q are a line pressure control valve 41, a pressure reduction valve 42, a change ratio control valve 43, change ratio fixing valve 44, a hydraulic pressure modification valve 45, a clutch valve 46, a manual valve 47, a converter relief valve 48 and a lockup control valve 49. The change ratio control valve 43 is directly controlled by a primary duty solenoid 52, the change ratio fixing valve 44 is directly controlled by an ON/OFF type solenoid 55, the clutch valve 46 is directly controlled by a clutch duty solenoid 53 and the lockup control valve 49 is directly controlled by an ON/OFF type solenoid 54.

The line pressure control valve 41 first adjusts the line pressure of the hydraulic operating oil discharged from the oil pump 40 to a predetermined level and supplies the adjusted operating oil to the secondary chamber 37 of the secondary pulley 31 via a line 101. Another output of the line pressure control valve 41 is sent via a line 102 to the clutch valve 46, which adjusts the hydraulic pressure at the line 102 using a duty solenoid 53 to a predetermined level and supplies the adjusted line pressure to the manual valve 47 and the lockup control valve 49.

The pressure reduction valve 42 reduces the line pressure supplied to the secondary chamber 37 and generates pilot pressure to be supplied to the pressure modification valve 45, the change ratio control valve 43, the change ratio fixing valve 44 and the clutch valve 46.

The pilot pressure for controlling the line pressure (secondary pressure) is adjusted by electrically controlling the duty rate of the duty solenoid 51. More specifically, the pressure controlled by the solenoid 51 is introduced to a pilot chamber of the modification valve 45, which is opened and fastened in accordance with the pressure, the pressure at a line 104 controlled corresponding to the open-and-fasten-status of the modification valve 45 is introduced to a pilot chamber of the line pressure control valve 41, thus providing desired line pressure. Note that the line pressure control valve 41 can directly control the line pressure by duty solenoid and the like. Also, the pressure modification valve 45 and the like can obtain appropriate pressure compensating oil leakage in the hydraulic circuit.

The change ratio control valve 43 is controlled by the primary duty solenoid 52. Pressure on a line 106 generated by the valve 43 is sent via the change ratio fixing valve 44 to the primary chamber 27. The valve 44 is controlled by the ON/OFF solenoid 55. When the solenoid 55 is turned on, a line 107 to the primary chamber 27 is connected to a line 106, and is disconnected when the solenoid 55 is turned off. In other words, by turning the solenoid 55 off, the pressure actings on the primary chamber 27 can be fixed regardless of any operation of the valve 43. For this arrangement, the rotation of the primary pulley 21 can be prevented from increasing without limitation in case the valve 43 becomes sticky.

The change ratio control valve 43 is controlled by the primary duty solenoid 52. When the solenoid 52 is turned on, the hydraulic pressure in the primary chamber 27 is drained via lines 107, 106, 108 and a relief ball 105, and no hydraulic pressure is generated in the primary chamber 27. Contrary, when the solenoid 52 is turned off, a drain pipe 108 is closed, the line pressure is introduced via an orifice 109 and line 106 to the primary chamber 27, and the valve 43 is opened in an opening rate according to a duty rate of the solenoid 52. Since the pressure is introduced via the orifice 109, the pressure in the primary chamber 27 does not increase rapidly.

The clutch valve 46 is controlled by the clutch duty solenoid 53. The line pressure controlled by the solenoid 53 is supplied to the manual valve 47 and the lockup control valve 49 via a line 103.

In the forward mode, the line pressure is applied to the FWD clutch chamber 16 via the line 103, the valve 43 and a line 110, while the line pressure in the REV clutch chamber 17 is discharged via a line 112. On the other hand, in the reverse mode, the line pressure is supplied to the REV clutch chamber 17 via lines 103, 113 and 112 as well as to the FWD clutch chamber 16 via the line 110.

The lockup control valve 49 is controlled by the ON/OFF solenoid 54. When the valve 49 is in a locking operation, a line 116 connected to the converter rear chamber 10 communicates with the relief valve 48 via the relief line 115.

<Electronic Control System of Stepless Transmission Z>

The structure of a control system of the stepless transmission Z will be described with reference to FIG. 3.

A shift position signal RANGE from a shift position sensor 82 which detects shift positions D, 1, 2, R, N and P by an operator's instruction, a primary pulley revolution signal Np from a primary revolution sensor 83 (omitted from FIG. 2) which detects a revolutional frequency Np of the primary pulley 21, a secondary pulley revolutional frequency signal Ns from a secondary revolution sensor 84 (omitted from FIG. 2) which detects a revolutional frequency (or a vehicle velocity) Ns of the secondary pulley 31, a throttle opening signal TVO from a throttle opening sensor 85 (omitted from FIG. 2) which detects a throttle opening degree TVO of the engine A, an engine revolutional frequency signal NE. from an engine speed sensor 86 (omitted from FIG. 2) which detects an engine revolutional frequency Ns, a turbine revolutional frequency signal NT from a turbine revolution sensor 87 (omitted from FIG. 2) which detects a turbine revolutional frequency of the turbine shaft 2 in the torque converter B, an oil temperature signal THO from an oil temperature sensor 88 (omitted from FIG. 2) which detects oil temperature of the hydraulic circuit Q, and an oil pressure signal Poil are input into a control unit 78. Solenoid valves 51, 52 and 53 are connected to the control unit 78. The control unit 78 controls these valves in accordance with the above signals detected by the sensors 82 to 89.

The control unit 78 comprises an A/D converter which converts these analogue signals to digital, a wave-shaper circuit which shapes detected signals by the sensors, an I/O interface, a micro-computer, a drive circuit for supplying a driving current to the plural solenoids and the like. In the micro-computer, a ROM stores in advance a control program (described later) for transmission control and accompanying various maps and formulas for table calculations.

Next, a control procedure of the stepless transmission Z, i.e., a control operation of the duty solenoid 52 which controls the pressure applied to the primary chamber 27 for controlling the internal diameter of the primary pulley 23 will be described with reference to FIGS. 5 through 17. Note that in the flowcharts of FIGS. 5 through 9, Si (i=1, 2, 3 ...) denotes respective steps; an additional numeral (i) of the character S denotes current control cycle, and (i−1), a previous control cycle. This transmission control can be applied to both a stable period operation and a transitional period operation.

Main Routine

Figure 5:
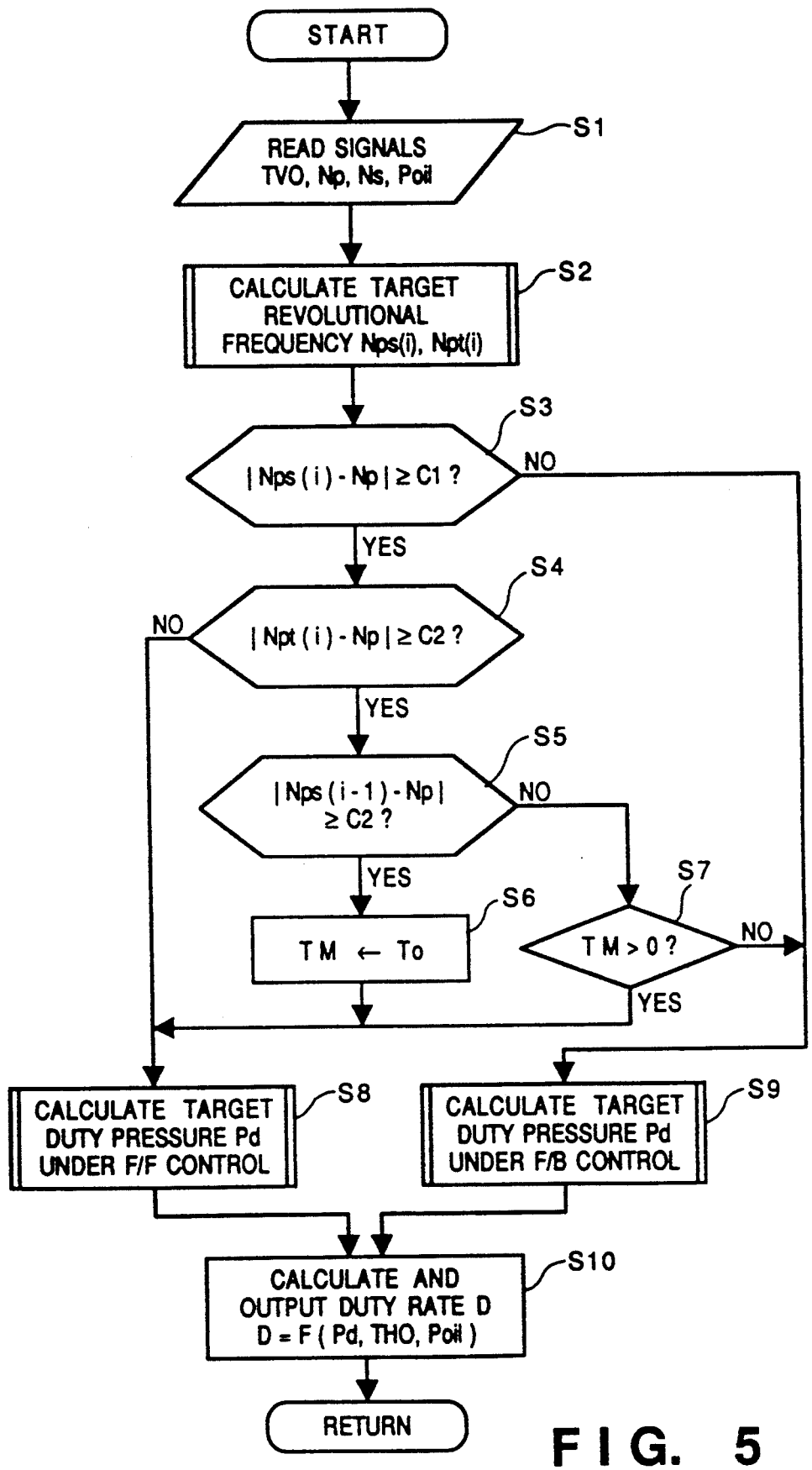
FIG. 5 is a flowchart showing as a main routine a transmission control according to the embodiment.

First, the main routine as shown in FIG. 5 will be described below.

In step S1, after the engine starts, the various detection signals (the engine throttle opening degree TVO, the primary revolutional frequency Np, the secondary revolutional frequency Ns, the hydraulic pressure Poil, etc.) are read out by the above-described sensors. In step S2, a target value Nps(i) of stable revolutional frequency and a target value Npt(i) of transitional revolutional frequency are calculated. Next, in step S3, whether an absolute value $(=|Nps(i)-Np|)$ of the difference between Nps(i) calculated in step S2 and Np read in step S1 is equal to or larger than a predetermined value C1 is determined. When the decision in step S3 is NO, where the difference is very small in a stable operation for a reason described below, the control moves to step S9, where target duty pressure Pd under F/B (feedback) control is calculated. "Duty pressure" means controlling oil pressure applied to the duty solenoid 52. The primary chamber 27 is supplied with hydraulic pressure proportional to the above duty pressure Pd, thus controlling the transmission.

On the other hand, in a transitional operation after an acceleration operation/a deceleration operation, as a result of the calculation in step S2, the stable target revolutional frequency Nps(i) substantially varies, therefore an absolute value ($=|Nps(i)-Np|$) of the difference between the stable target revolutional frequency Nps(i) and the actual value Np is equal to or larger than the predetermined value C1. At this time, the control advances from step S3 to step S4.

The control in steps S4 through S7 is made in consideration of a conceivable failure in F/F (feedforward) control for controlling the duty pressure Pd in step S8. If the F/F control has been satisfactorily performed, the flow jumps from step S4 to step S8, where the target duty pressure Pd under F/F control is calculated. When the current revolutional frequency Np largely differs from the target revolutional frequency Nps, the F/F control is performed for rapid convergence upon the target value. When the current revolutional frequency Np is close to the target value (NO in step S3), F/B control is performed in step S9 for precise convergence upon the target value.

The fail-safe control in steps S4 through S7 will be described below.

Figure 14:
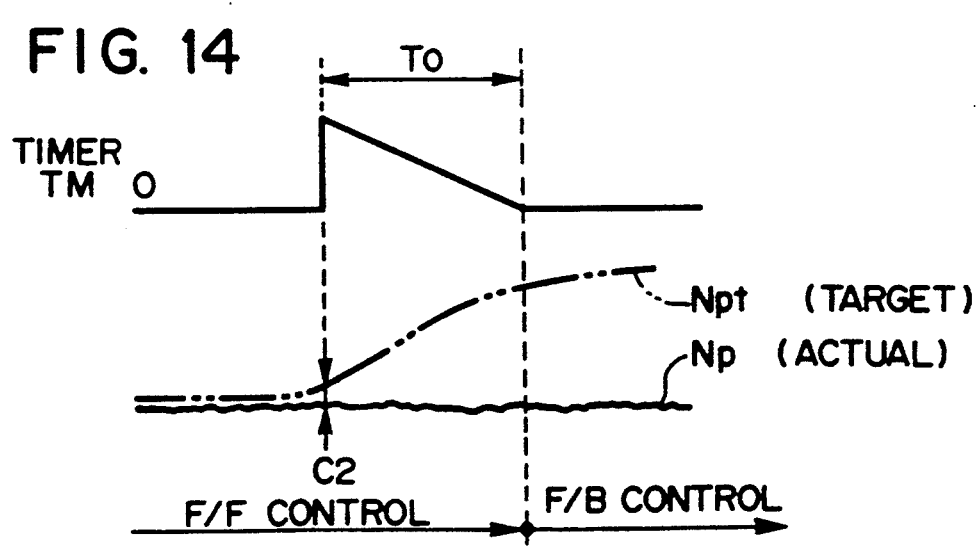
FIG. 14 is a timing chart showing a timer TM.

In case the F/F control fails, the difference between a target value Npt(i) of transitional revolutional frequency and the actual primary revolutional frequency Np increases as shown in FIG. 14. When a predetermined time T0 has passed after the difference becomes equal to or larger than a predetermined value C2, the F/F control is forcibly changed to F/B control.

More specifically, when the absolute value of the difference between the target value Npt(i) and the real value Np becomes equal to or larger than the predetermined value C2, whether an absolute value of the difference between a previous target value Npt(i−1) and a previous actual value Np (i−1) was smaller than the predetermined value C2 is determined in step S5. If YES is the result, i.e., $|Npt(i-1)-Np(i-1)|<C2$, this means that the failure was not detected in the previous control cycle but has been detected in the current control cycle. In this case, in step S6, the predetermined time T0 is set at a timer TM, and the control proceeds to step S8. Thereafter, the flow repeats to loop steps S4→S5→S7→S8, during which the timer TM is counted-down until the predetermined time T0 has passed, and the control moves from step S7 to step S9, where the F/F control is forcibly changed to the F/B control.

After the calculation in step S8 or the calculation in step S9, the control advances to step S10, where a duty rate D indicative of the driving current of the duty solenoid 52 is calculated based upon the target duty pressure Pd calculated in step S8 or step S9. When the calculated driving current is output to the duty solenoid 52, the control returns to step S1.

Thereafter, the flow repeats steps S1 through S10 in the above-described manner.

Next, the respective calculations in steps S2, S8 and S9 will be described below.

Calculations of Nps and Npt

Figure 6:
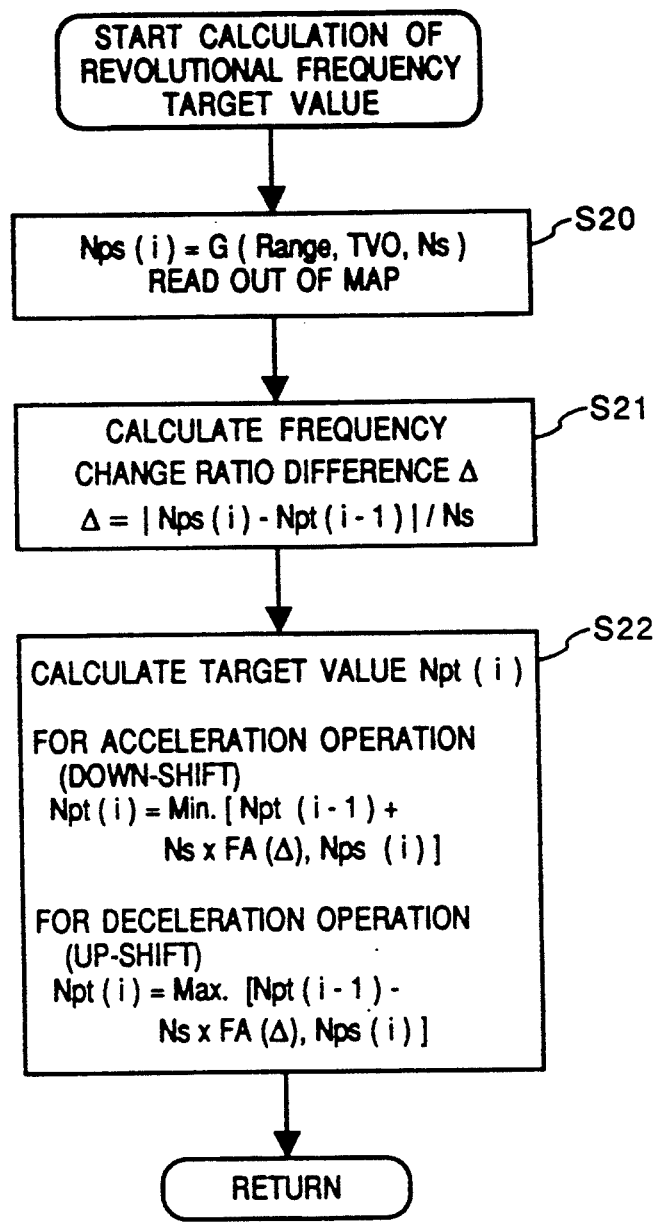
FIG. 6 is a flowchart showing as a subroutine a calculation of a target revolutional frequency.

The calculation of the target value Nps(i) of stable revolutional frequency and the target value Npt(i) of transitional revolutional frequency will be described as a subroutine of step S2 with reference to FIG. 6.

Figure 4:
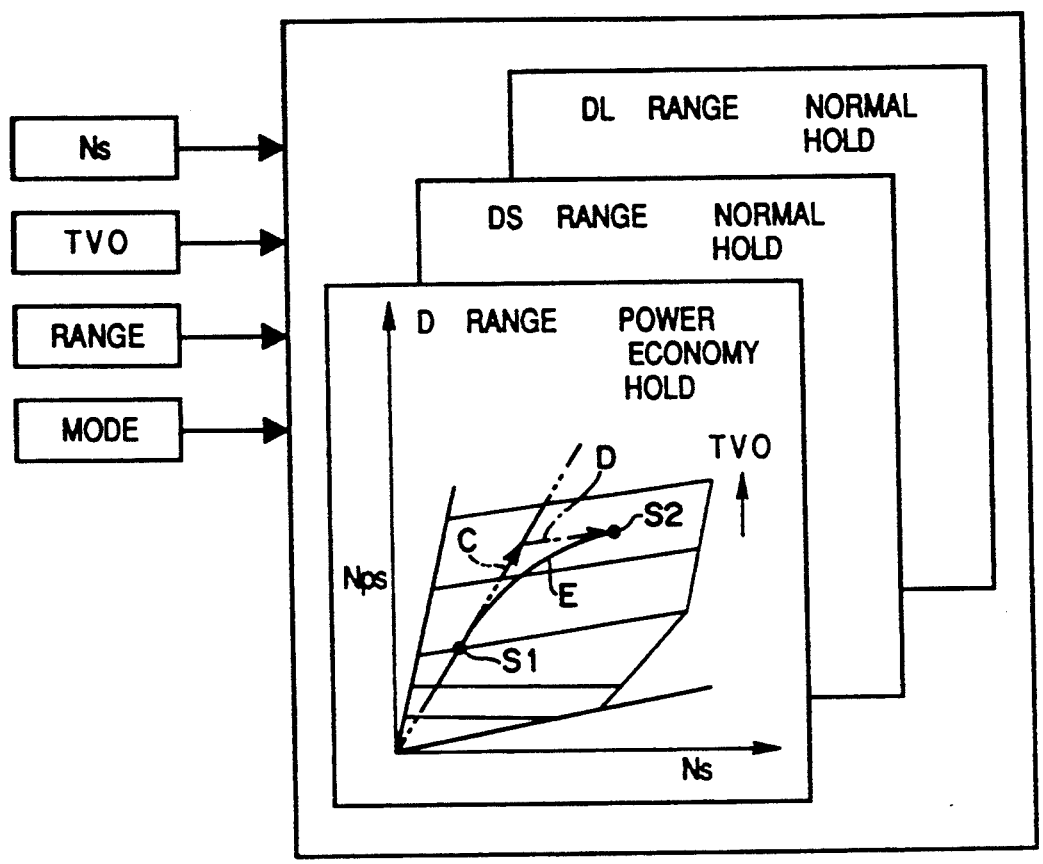
FIG. 4 is a diagram for explaining a map setting a primary revolutional frequency Nps used in a transmission control apparatus of the embodiment.

In step S20, the stable target revolutional frequency Nps(i) is determined with the shift position signal RANGE, the throttle opening degree TVO and the actual secondary pulley revolutional frequency Ns as parameters, i.e. the target value Nps is read out of a map shown in FIG. 4. Next, in step S21, a frequency change ratio difference Δ is calculated by dividing the absolute value of the difference between the current Nps(i) and the previous Npt(i−1) by an actual secondary pulley revolutional frequency Ns. More specifically, $$\Delta = |Nps(i)/Ns - Npt(i-1)/Ns| Nps(i) - Npt(i-1)|/Ns \quad (1)$$

The frequency change ratio difference Δ can be obtained in the form of absolute value of the difference between a stable target frequency change ratio Nps(i)/Ns and a previous transition target frequency change ratio Npt(i−1)/Ns. This frequency change ratio difference Δ, which is not influenced by an engine revolutional frequency and vehicle velocity, simplifies the calculations for the transmission control. Note that as an initial value of the current Npt(i) in the transitional period, a target value Npt just before the transitional period (however, it is approximately identical to the Np, Nps) is used.

Figure 10:
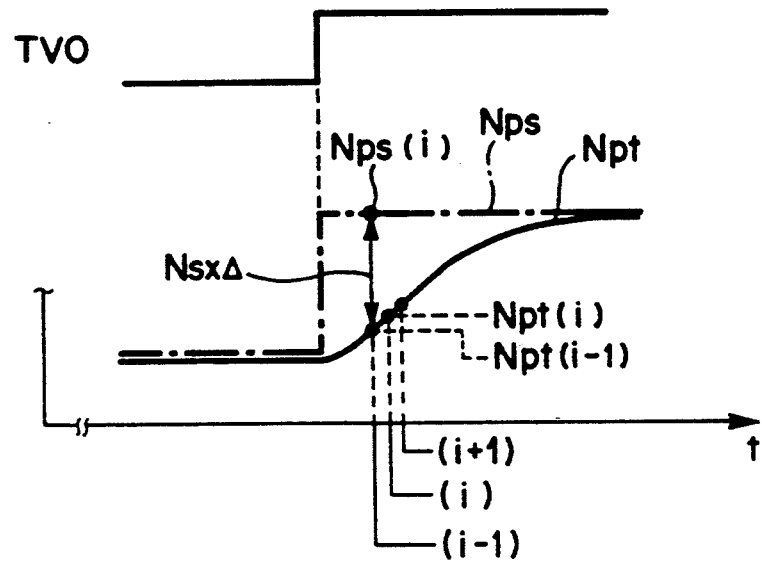
FIG. 10 is a timing chart showing a stable target revolutional frequency and a transitional target revolutional frequency in an acceleration operation.

Next, in step S22, the current target value Npt (i) of transitional revolutional frequency of the primary pulley 21 is calculated in different algorithms respectively for an acceleration operation (shift-down) or a deceleration operation (shift-up) (FIG. 10). More specifically, when the control is performed in an acceleration operation (shift-down), the target value Npt(i) is calculated as smaller one of $Npt(i-1)+Ns \times FA(\Delta)$ or Nps(i), i.e., $$Npt(i) = Min\{Npt(i-1)+Ns \times FA(\Delta), Nps(i)\} \quad (2)$$

When the control is performed in a deceleration operation (shift-up), the target value Npt(i) is calculated as a larger one of $Npt(i-1)-Ns \times FA(\Delta)$ or Nps(i), i.e., $$Npt(i) = Max\{Npt(i-1)-Ns \times FA(\Delta), Nps(i)\} \quad (3)$$

Figure 11:
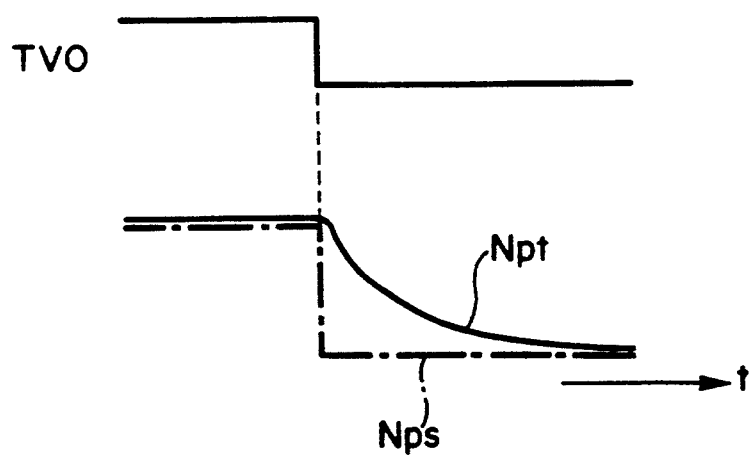
FIG. 11 is a timing chart showing a stable target revolutional frequency and a transitional target revolutional frequency in a deceleration operation.

In (2) and (3), Nps(i) is introduced for prevention of erroneous control or hunting. Accordingly, as shown in FIGS. 10 and 11, Npt(i) can be considered as, in an acceleration operation, $$Npt(i) = Npt(i-1)+Ns \times FA(\Delta) \quad (2')$$

and, in a deceleration operation, as $$Npt(i) = Npt(i-1)-Ns \times FA(\Delta) \quad (3')$$

Figure 12:
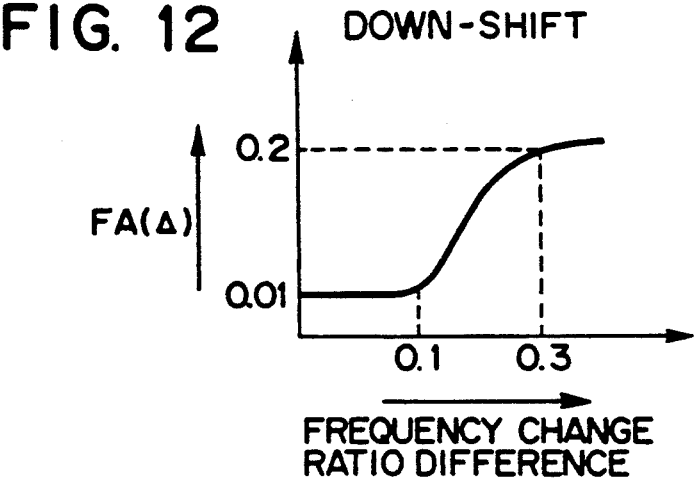
FIG. 12 is a line chart showing a function FA($\Delta$) for down-shift.
Figure 13:
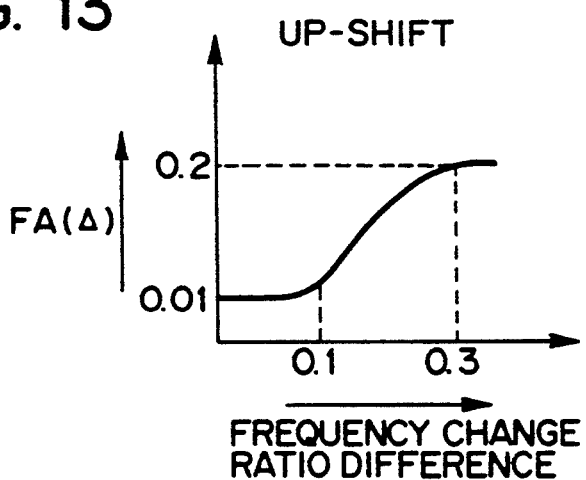
FIG. 13 is a line chart showing a function FA ($\Delta$) for up-shift.

FA(Δ) is a function of the frequency change ratio difference Δ as its parameter, as shown in FIG. 12 (down-shift) and FIG. 13 (up-shift). For this reason, the current target value Npt(i) is set based upon the previous Npt(i−1) and the frequency change ratio difference Δ.

As shown in FIGS. 12 and 13, it is the characteristic of the function FA(Δ) to take a large value when the frequency change ratio difference Δ is large just after the control has moved into a transitional status, and to take a small value when the frequency change ratio difference Δ is small as a predetermined period of time has passed after the control moved into the transitional status.

FIG. 10 shows changes of Nps and Npt upon an extreme increase of the throttle opening degree TVO in an acceleration operation. Even in a case where the throttle opening degree TVO extremely increases and the target value Nps of stable revolutional frequency increases by Ns×Δ in a stepwise manner to change into Nps(i) as shown in FIG. 10, if the current Npt(i) is calculated using function FA(Δ) shown in FIGS. 12 and 13, the target value Npt of the primary pulley 21 smoothly increases with its rate of change gradually decreasing. Note that the rate of change decreases because Δ decreases as time passes. As the above control can restrain the rapid increase of the engine revolutional frequency immediately after an acceleration operation, engine output torque wasted in increasing the engine revolutional frequency can be saved. As a result, the most of the increase of the engine output torque is substantially distributed to running torque, improving an acceleration operation immediately after a driver's acceleration operation has started and during the acceleration operation thereafter.

Note that in a slow acceleration operation, as FA(Δ) indicates a small value since the frequency change ratio difference Δ takes a small value, Npt(i) varies following the stable revolutional frequency target value Nps.

Feedforward Control of Target Duty Pressure Pd

Next, the calculation of the target duty pressure Pd under F/F (feedforward) control will be described as a subroutine of step S8 in FIG. 5 with reference to FIG. 7.

First, a target change ratio velocity Rv is calculated in step S30 as $$Rv = \{Npt(i) - Npt(i-1)\}/Ns \quad (4)$$

In step S31, the target duty pressure Pd is obtained as the sum of a predetermined function Gd(Rv, Ps) having the target change ratio velocity Rv and the actual line pressure Ps, applied to the secondary pulley 31 as its parameter, and neutral position duty pressure Pmd, i.e., $$Pd = Gd(Rv, Ps) + Pmd \quad (5)$$

Figure 9:
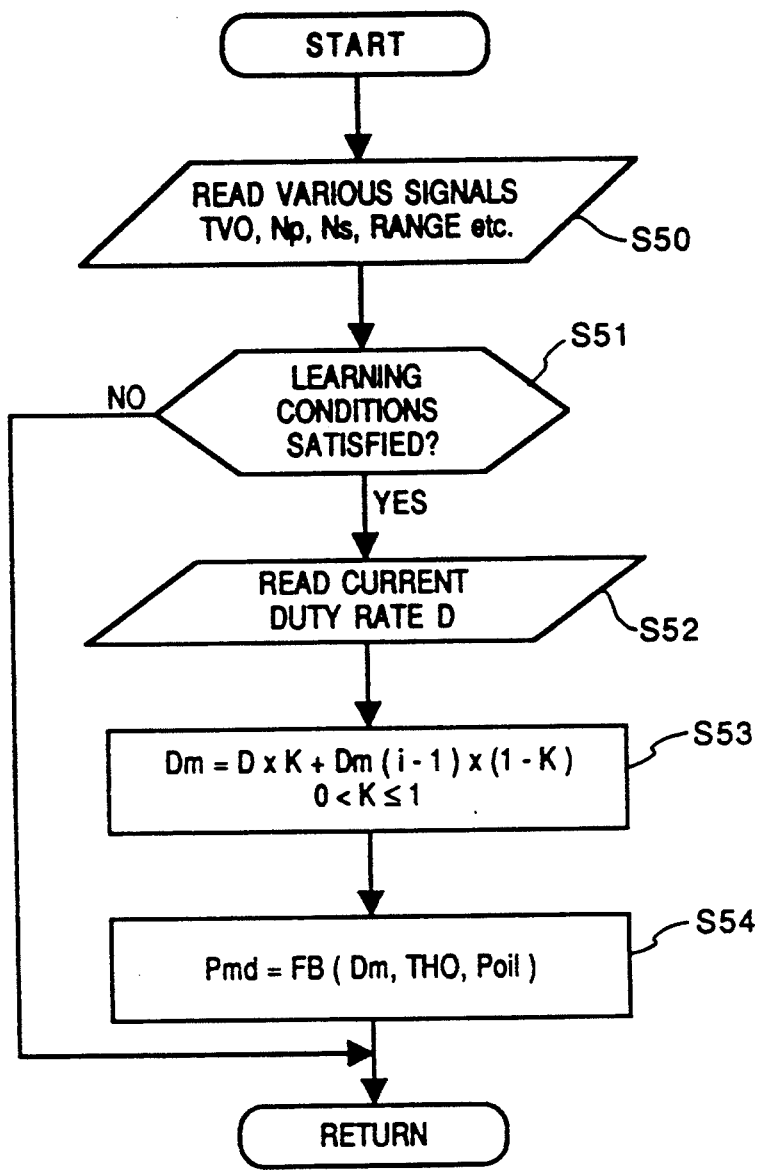
FIG. 9 is a flowchart showing as a subroutine a learning control.

The neutral position duty pressure Pmd is obtained and updated by a learning control (FIG. 9).

Figure 15:
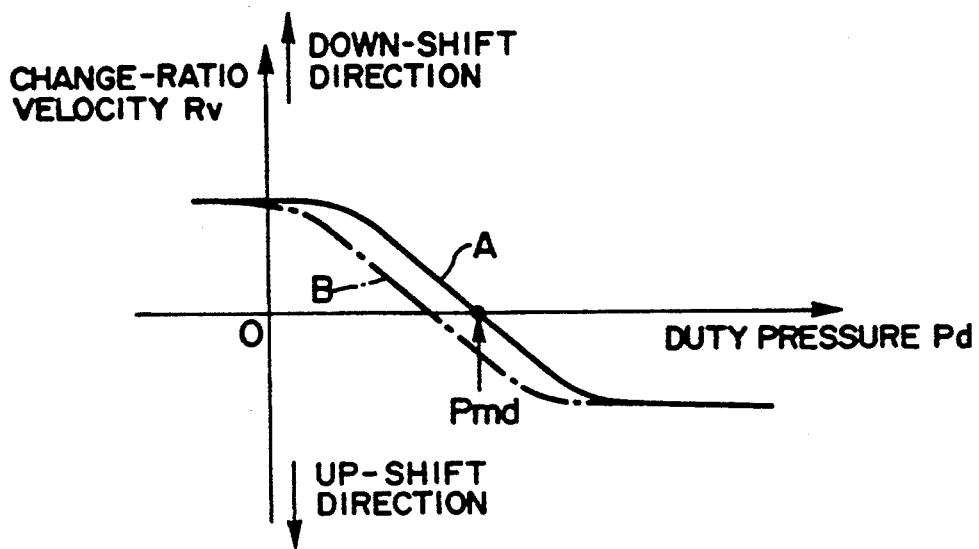
FIG. 15 illustrates the correlational characteristic between duty pressure and a change ratio velocity.
Figure 16:
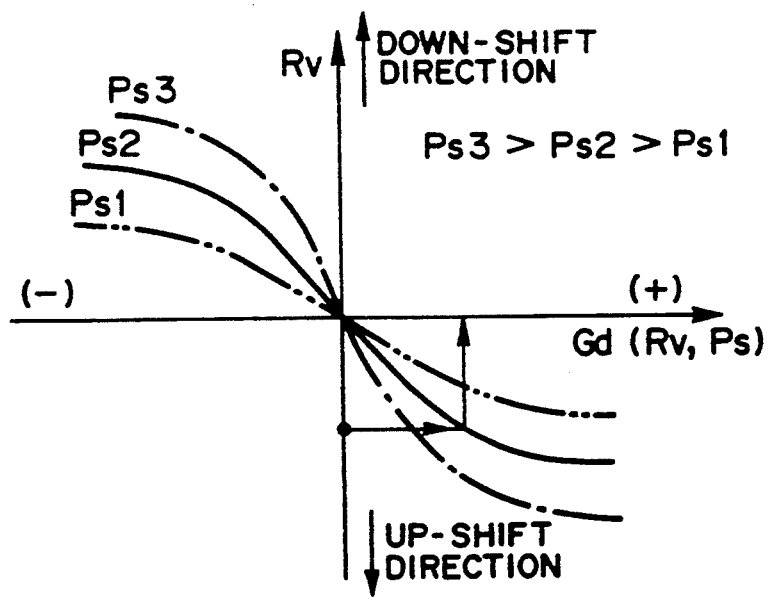
FIG. 16 illustrates the characteristic of a function Gd(Rv, Ps)

With reference to FIGS. 15 and 16, Gd will be explained in detail. The duty solenoid 52 has variations as a product due to respective production errors. The relation between the duty pressure Pd and the change ratio velocity Rv varies showing characteristics as a solid line A and a dot-dash line B in FIG. 15. Note that the neutral position duty pressure Pmd is a value at which the change ratio velocity Rv crosses zero. The neutral position duty pressure Pmd differs depending upon respective duty solenoids 52 as products. In this embodiment, the neutral position duty pressure Pmd is set by the learning control.

FIG. 16 shows an example of a characteristic of the function Gd(Rv, Ps). The Gd has been set in advance by the map of FIG. 16 or by a table with a plurality of values of the line pressure Ps (Ps1, ps2, Ps3) as parameters, and in step S31, this Gd(Rv, Ps) and the neutral position duty pressure Pmd are used for calculation of the target duty pressure Pd. Thus, the target duty pressure Pd is set with the change ratio velocity Rv, raising response of the control.

Feedback Control of Target Duty Pressure Pd

Figure 8:
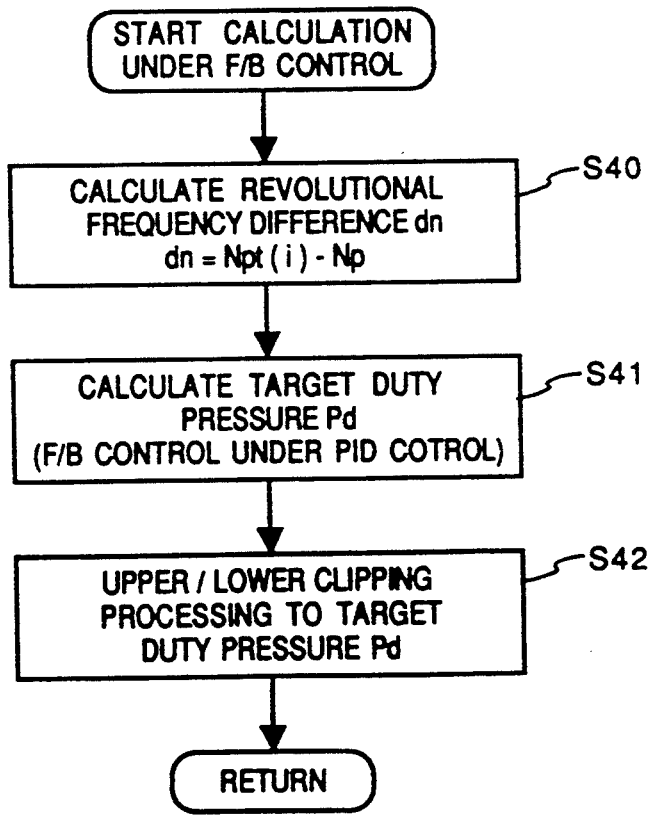
FIG. 8 is a flowchart showing as a subroutine a calculation of a target duty pressure under F/B (feedback) control.

The calculation of the target duty pressure Pd under F/B (feedback) control will be described as a subroutine of step S9 in FIG. 5 with reference to FIG. 8.

In step S40, a revolutional frequency difference dn is calculated as the difference between the current target value Npt(i) of transitional revolutional frequency and the actual primary revolutional frequency Np, i.e., $$Npt(i) - Np \quad (6)$$

Next, in step S41, the target duty pressure Pd is calculated by a general PID control using the revolutional frequency difference dn, and in step S42, an upper/lower clipping processing is performed to the target duty pressure Pd obtained in step S41. Upper/lower clip values are target duty pressure Pd's which have been obtained in the above-described F/F control (FIG. 7) and updated in a memory. The upper/lower clipping processing to the target duty pressure Pd secures the convergence of the control, preventing hunting which easily occurs in F/F control. Further, by using the target duty pressure Pd obtained under F/F control as a clip value, the continuity of the target duty pressure Pd set under F/F control and the target duty pressure Pd set under F/B control can be established.

Learning of Pmd

The learning control for updating the neutral position duty pressure Pmd will be described with reference to a flowchart of FIG. 9.

This control is performed in accordance with interruption which occur at predetermined intervals.

First, TVO, Np, Ns, RANGE and other signals are read in step S50. In step S51, whether learning conditions are satisfied is determined. The learning conditions are: 1) the duty rate D is equal to or smaller than a predetermined value; 2) the rate of change of the frequency change ratio difference Δ is equal to or smaller than a predetermined value; 3) the frequency change ratio difference Δ is within a predetermined range; 4) a battery pressure is equal to or larger than a predetermined value; and 5) oil temperature THO is equal to or larger than a predetermined value. When these five conditions are satisfied for predetermined period of time, i.e., in a state where these values do not remarkably vary, the learning control is performed.

When the learning conditions are satisfied, a current duty rate D is read in step S52, then a learned value of the current duty rate Dm is calculated by weighing the current duty rate D and a previous learned value Dm(i−1) with a predetermined value, i.e., $$Dm = D \times K + Dm(i-1) \times (1-K) \quad (7)$$

In step S54, a neutral position duty pressure Pmd is determined based upon a predetermined map or a table having a duty rate D, oil temperature THO and hydraulic pressure Poil as parameters, $$Pmd = Fb(Dm, THO, Poil) \quad (8)$$

This value is stored in the memory and is updated there.

FIG. 4 illustrates conventional transmission control operation and the transmission control operation of the embodiment of the present invention. When shift-down operation is performed, according to the conventional transmission control, a first stable status S1 changes to a second stable status S2 along straight lines C and D, while in the embodiment of the present invention, the first stable status S1 changes to the second stable status S2 along a curved line E.

<Advantages of Control System of Embodiment>

As described above, in the transmission control according to this embodiment,

①: In a transition period after a driver's acceleration operation, a target value Npt(i) of transitional revolutional frequency is set to be smaller than a target value Nps(i) of stable revolutional frequency determined from a map, so that the engine revolutional frequency at an initial stage of the transitional period can be prevented from rapidly increasing. Therefore, the acceleration operation at the initial stage of the transitional period and an acceleration operation thereafter can be improved.

②: As shown in steps S21 and S22 of FIG. 6, a current Npt(i) is set based upon the frequency change ratio difference $\Delta$ which is an absolute value of the difference between the target value of the stable frequency change ratio difference and the transitional frequency change ratio difference and upon the previous Npt(i−1). Accordingly, a current Npt(i) can be appropriately set from moment to moment in accordance with the frequency change ratio difference $\Delta$, which enables precise control.

③: At least at the initial stage of the transitional period, the target duty pressure Pd is controlled under F/F control, which realizes the desired control characteristic without any delayed response as occurs in F/B control.

④: As shown in step S3, when the actual revolutional frequency of the primary pulley Np becomes close to the target value Nps(i) of stable revolutional frequency and the difference becomes small, the current F/F control is changed over to F/B control. Further, the target duty pressure Pd is upper/lower clipping processed. Accordingly, Npt(i) continuously and smoothly reaches Nps(i).

<Modifications>

Finally, various modifications of the embodiment will be described.

M-1

Figure 17:
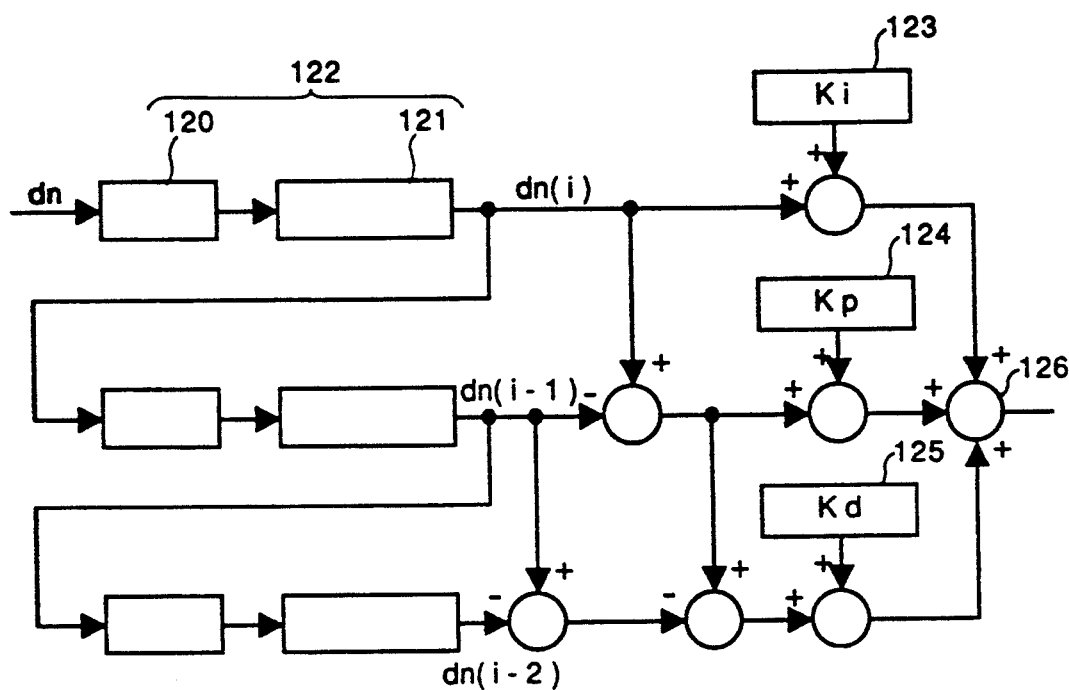
FIG. 17 illustrates the structure of a control circuit for PID (proportional Integral and Derivative) control.

The calculation of the target duty pressure Pd under the PID control in step S41 can be performed using a control circuit as shown in FIG. 17 instead of a software. In this control circuit, a revolutional frequency difference signal dn is output as signals dn(i), dn(i−1) and dn(i−2) via three sample hold circuits 122 constituted by a switch portion 120 and a holding portion 121. dn(i) is multiplied by integral constant K1 from an integral constant setting unit 123, {dn(i)−2dn(i−1)+dn(i−2)} is multiplied by an integral constant Kp from a proportional constant setting unit 124, (dn(i−1)−dn(i−2)} is multiplied by a differential constant Kd from a differential constant setting unit 125. The signals are added by an adder 126 and are output.

M-2

In step S3 of FIG. 5, instead of {Npt(i)−Np}, an absolute value of {Npt(i)−Npt(i−1)} may be employed. Further, an absolute value of the rate of change of the throttle opening degree TVO may be employed.

M-3

Figure 7:
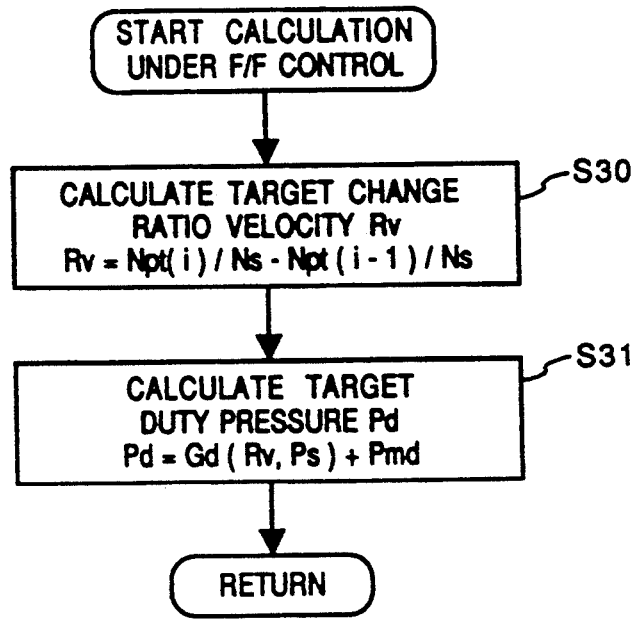
FIG. 7 is a flowchart showing as a subroutine a calculation of a target duty pressure under F/F (feedforward) control.

In the place of the line pressure Ps in function Gd(Rv, Ps) in step S31 of FIG. 7, any one of the frequency change ratio difference $\Delta$, Np, Ns, the throttle opening degree TVO, the engine revolutional frequency Ne may be employed.

M-4

The characteristic of FA($\Delta$) is not limited to that shown in FIGS. 12 and 13. It may be set to various desired characteristics.

M-5

In the above-described embodiment, the control learns and updates both the duty rate Dm and the neutral position duty pressure Pmd. However, it may be arranged that the control learns only the duty rate Dm. In this case, in the calculation of Pd in step S31 of FIG. 7, the neutral position duty pressure Pmd is omitted, and the duty rate D in step SIO of FIG. 5 is obtained from $$D = F(Pd, THO, Poil) + Dm \qquad (9)$$

Note that the characteristic of map F(Pd, THO, Poil) is different from that described above.

The present invention is not limited to the above embodiments and various changes and modifications can be made within the spirit and scope of the present invention. Therefore, to apprise the public of the scope of the present invention, the following claims are made.

What is claimed is:

1. A control apparatus which controls a stepless transmission for vehicles by cyclically controlling a control variable toward a target value to be set based upon a characteristic which has been set in advance, comprising:

signal detection means for detecting a plurality of signals indicative of the operating status of a stepless transmission or an engine connected to the stepless transmission;

status detection means for detecting the status of whether a vehicle is in an acceleration operation or in a deceleration operation;

target value setting means for setting a first target value and a second target value at a point in time during a transitional period in response to the status detected by said status detection means, wherein said target value setting means sets the first target value based upon the plurality of signals, sets the second target value based upon a difference between the first target value set in a current control cycle and a second target value set in a previous control cycle, and sets a change in the second target value to be smaller than that in the first target value; and control means for controlling the control variable toward the second target value.

2. The apparatus according to claim 1, wherein said stepless transmission comprises:

a primary pulley connected to an engine side;
a secondary pulley connected to a wheel side; and
a V-shaped belt extended between the primary pulley and the secondary pulley, and wherein the control variable is a change ratio defined by the ratio of a revolutional frequency of the primary pulley to that of the secondary pulley.

3. The apparatus according to claim 1, wherein said target value setting means calculates a change in the first target value as a change from the second target value set in the previous control cycle to the second target value set in the current control cycle, and calculates a change in the second target value as a change from the second target value set in the previous control cycle to the first target value to be set in the current control cycle.

4. The apparatus according to claim 2, wherein the target value setting means calculates the difference as an absolute value of the difference between the change ratio as the first target value set in the current control cycle and the change ratio as the second target value set in the previous control cycle, and wherein said target value setting means comprises
storage means for storing a change ratio correction function with the difference as its parameter, wherein the change ratio correction function has a characteristic to increase as the difference increases, but does not exceed one; and
means for reading the change ratio correction function out of said storage means, with the difference as the parameter, and for multiplying the correction function by the change ratio which is the second target value set in the previous control cycle.

5. The apparatus according to claim 1, wherein said target value setting means further comprises clip means for clipping the second target value by a predetermined threshold value.

6. The apparatus according to claim 5, wherein said stepless transmission comprises:
a primary pulley connected to an engine side;
a secondary pulley connected to a wheel side; and
a V-shaped belt extended between the primary pulley and the secondary pulley,
wherein effective diameters of the primary pulley and the
secondary pulley are controlled by hydraulic pressure, and
wherein the control variable is defined as a hydraulic pressure
target value for attaining a target value of the change ratio
defined by the ratio of a revolutional frequency of the primary
pulley to that of the secondary pulley,
and wherein said clip means clips the hydraulic pressure target value by an upper value and a lower value.

7. The apparatus according to claim 6, wherein said control means comprises:
means for controlling the control variable under feedforward control;
means for controlling the control variable under feedback control;
means for determining which control is used for controlling the control variable; and
means for, under the feedforward control, determining the upper value and the lower value based upon the difference between the change ratio of the second target value set in the previous control cycle and the change ratio of the second target value to be set in the current control cycle.

8. The apparatus according to claim 7, wherein said control means further comprises means for learning the upper value and the lower value.

* * * * *